Figure 1:
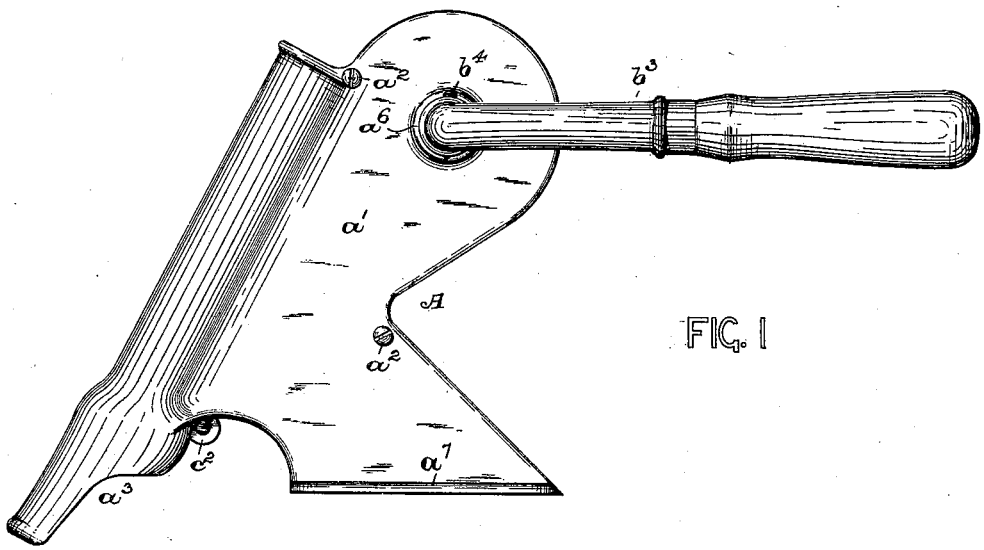

No. 615,938. Patented Dec. 13, 1898.
W. A. WILLIAMSON.
CORK EXTRACTOR.
(Application filed Oct. 2, 1897.)

(No Model.) 6 Sheets—Sheet 1.

WITNESSES:

INVENTOR:

WILLIAM A. WILLIAMSON,
BY
Fred C. Fraentzel,
ATTORNEY

No. 615,938. Patented Dec. 13, 1898.
W. A. WILLIAMSON.
CORK EXTRACTOR.
(Application filed Oct. 2, 1897.)
(No Model.) 6 Sheets—Sheet 2.

WITNESSES:
Wm H Canfield Jr
Nancy J Trusdell

INVENTOR:
WILLIAM A. WILLIAMSON
BY
Fred C. Fraentzel,
ATTORNEY

No. 615,938. Patented Dec. 13, 1898.
W. A. WILLIAMSON.
CORK EXTRACTOR.
(Application filed Oct. 2, 1897.)

(No Model.) 6 Sheets—Sheet 3.

WITNESSES:

INVENTOR:
WILLIAM A. WILLIAMSON,
BY
Fred C. Fraentzel,
ATTORNEY

No. 615,938. Patented Dec. 13, 1898.
W. A. WILLIAMSON.
CORK EXTRACTOR.
(Application filed Oct. 2, 1897.)

(No Model.) 6 Sheets—Sheet 4.

WITNESSES:

INVENTOR:
WILLIAM A. WILLIAMSON,
BY
Fred'k C. Fraentzel,
ATTORNEY

No. 615,938. Patented Dec. 13, 1898.
W. A. WILLIAMSON.
CORK EXTRACTOR.
(Application filed Oct. 2, 1897.)
(No Model.) 6 Sheets—Sheet 5.
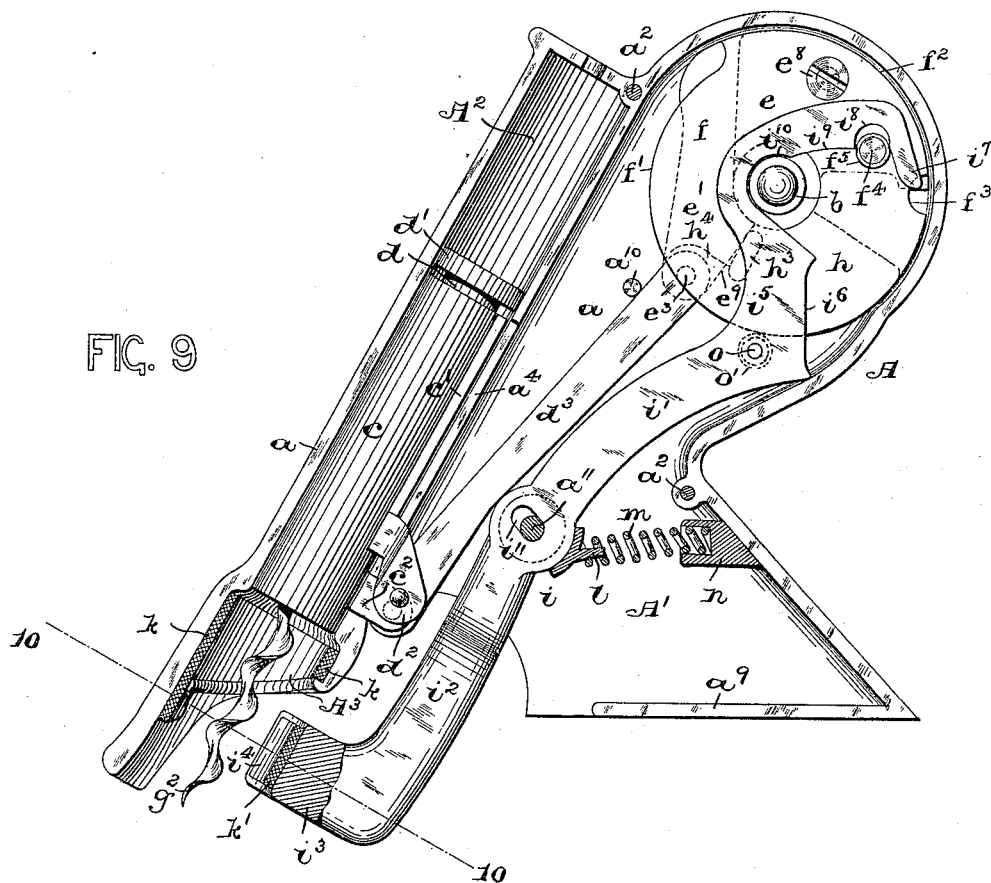
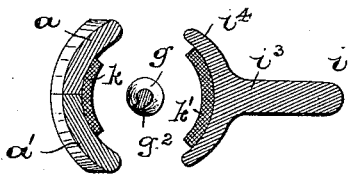
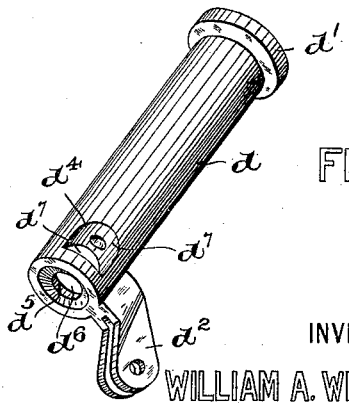
WITNESSES:
INVENTOR:
WILLIAM A. WILLIAMSON,
BY
Fred'k C. Fraentzel,
ATTORNEY No. 615,938. Patented Dec. 13, 1898.
W. A. WILLIAMSON.
CORK EXTRACTOR.
(Application filed Oct. 2, 1897.)
(No Model.) 6 Sheets—Sheet 6.

WITNESSES:

INVENTOR:
WILLIAM A. WILLIAMSON
BY
Fred C. Fraentzel,
ATTORNEY

UNITED STATES PATENT OFFICE.

WILLIAM A. WILLIAMSON, OF NEWARK, NEW JERSEY.

CORK-EXTRACTOR.

SPECIFICATION forming part of Letters Patent No. 615,938, dated December 13, 1898.

Application filed October 2, 1897. Serial No. 653,806. (No model.)

*To all whom it may concern:*

Be it known that I, WILLIAM A. WILLIAMSON, a citizen of the United States, residing at Newark, in the county of Essex and State of New Jersey, have invented certain new and useful Improvements in Cork-Extractors; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention has reference to improvements in cork-extractors of that class adapted to be secured to a bench or bar and in which the corkscrew proper is operated by suitable mechanism to penetrate the cork and draw it in one motion and to remove the cork from the corkscrew and return it to its initiative position in another motion, as fully described in the specification and illustrated in the accompanying drawings.

The primary object of this invention therefore is to provide a novel form of cork-extracting device or apparatus embodying the above-stated features, and, furthermore, to provide in connection with a cork-extracting device of this class a clamp, acting automatically, for holding the bottle against the downward pressure, while the corkscrew is penetrating the cork, to bring the bottle in its proper position and prevent breaking it at the neck while drawing the cork.

With these ends in view this invention has for its further object to provide a simple and inexpensive apparatus for extracting corks which shall be very efficient and the mechanism of which is not liable to get out of order.

The invention therefore consists of the novel form and construction of cork-extracting apparatus herein set forth, as well as in the novel arrangements and combinations of the parts and the details of the construction thereof, all of which will be more fully described in the accompanying specification and finally embodied in the clauses of the claim.

The invention is illustrated in the accompanying drawings, in which—

Figure 2:
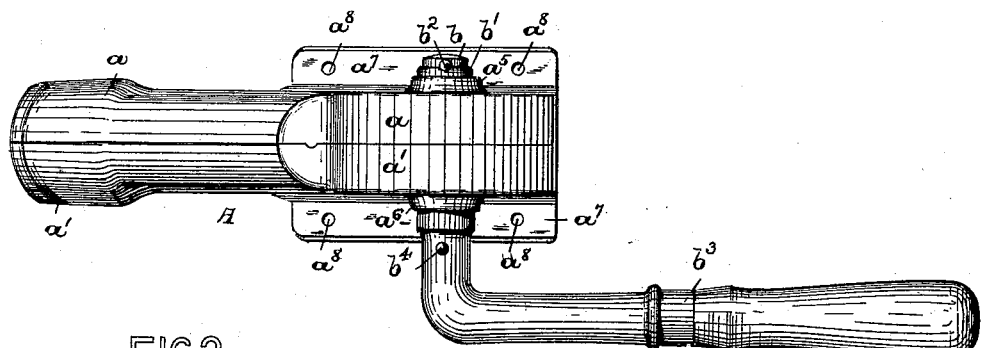
Figure 3:
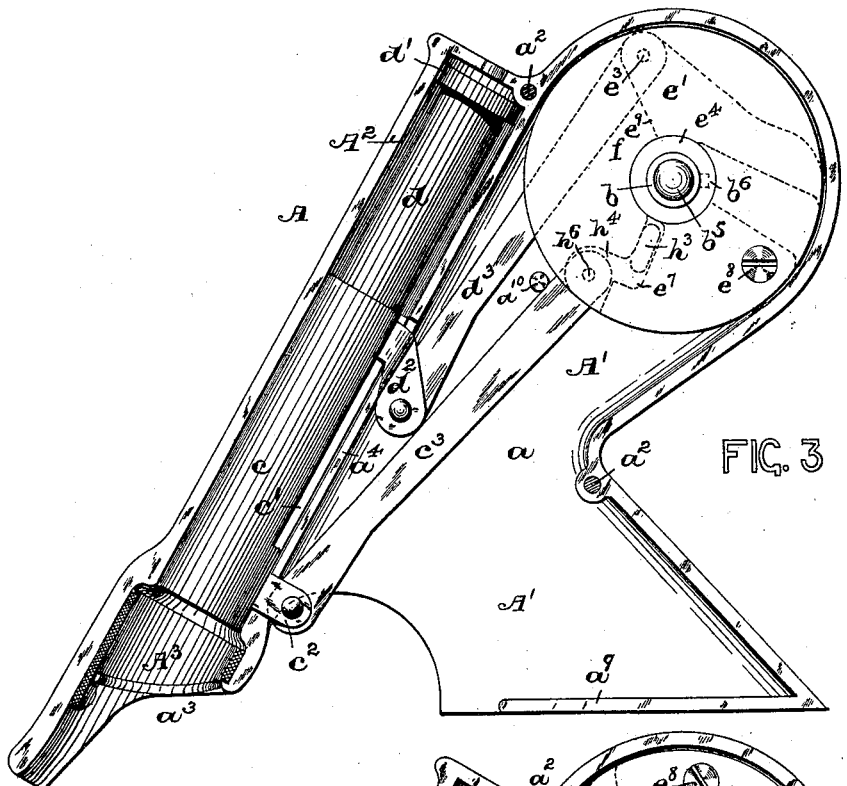
Figure 4:
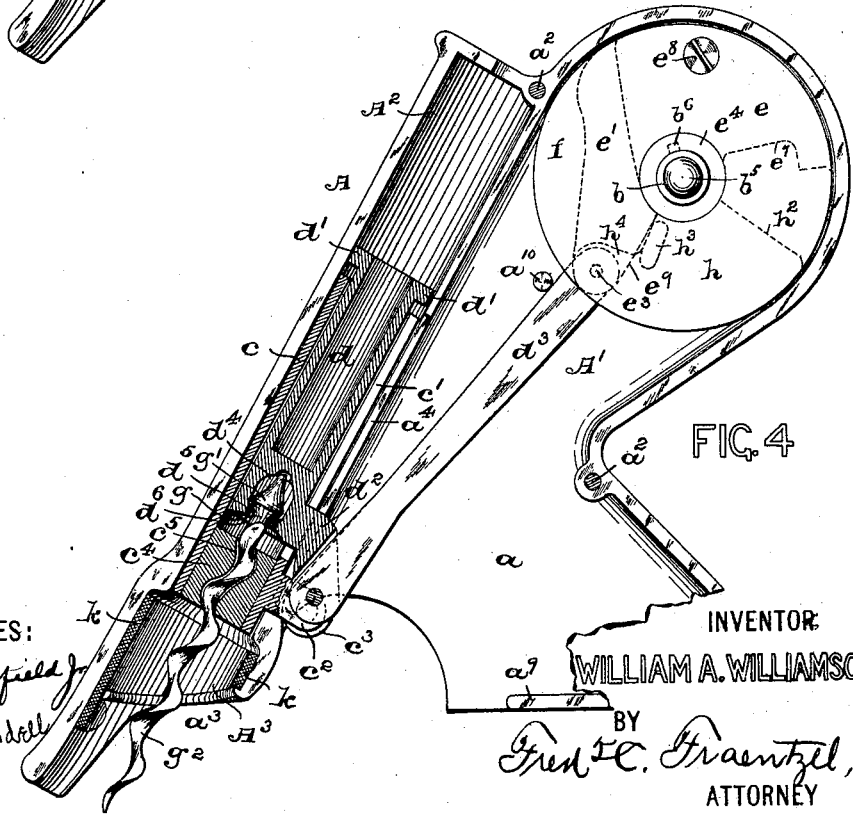
Figure 5:
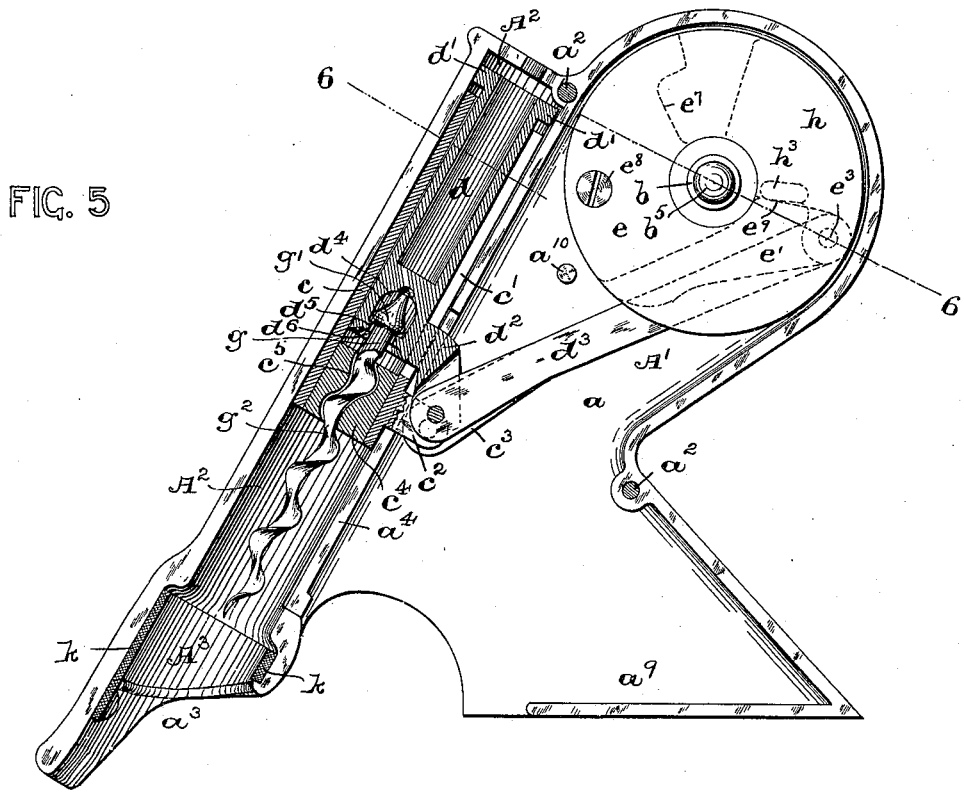
Figure 6:
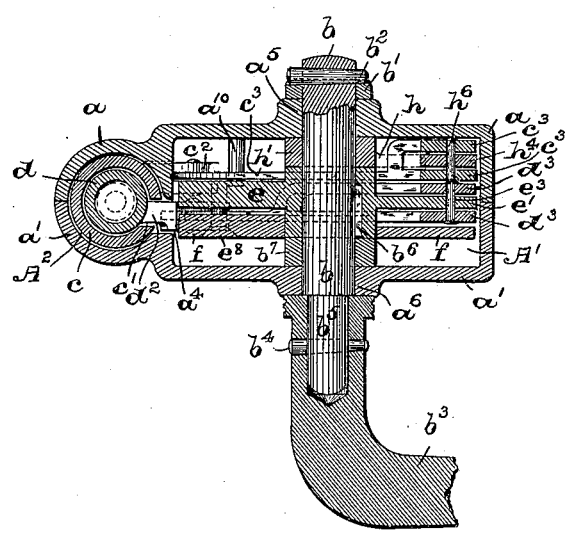
Figure 7:
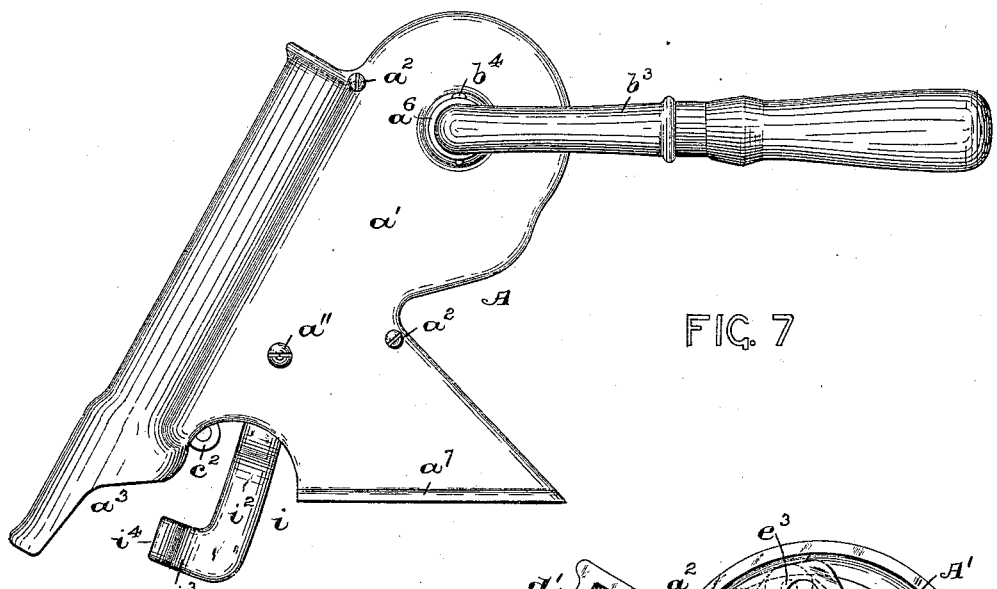
Figure 8:
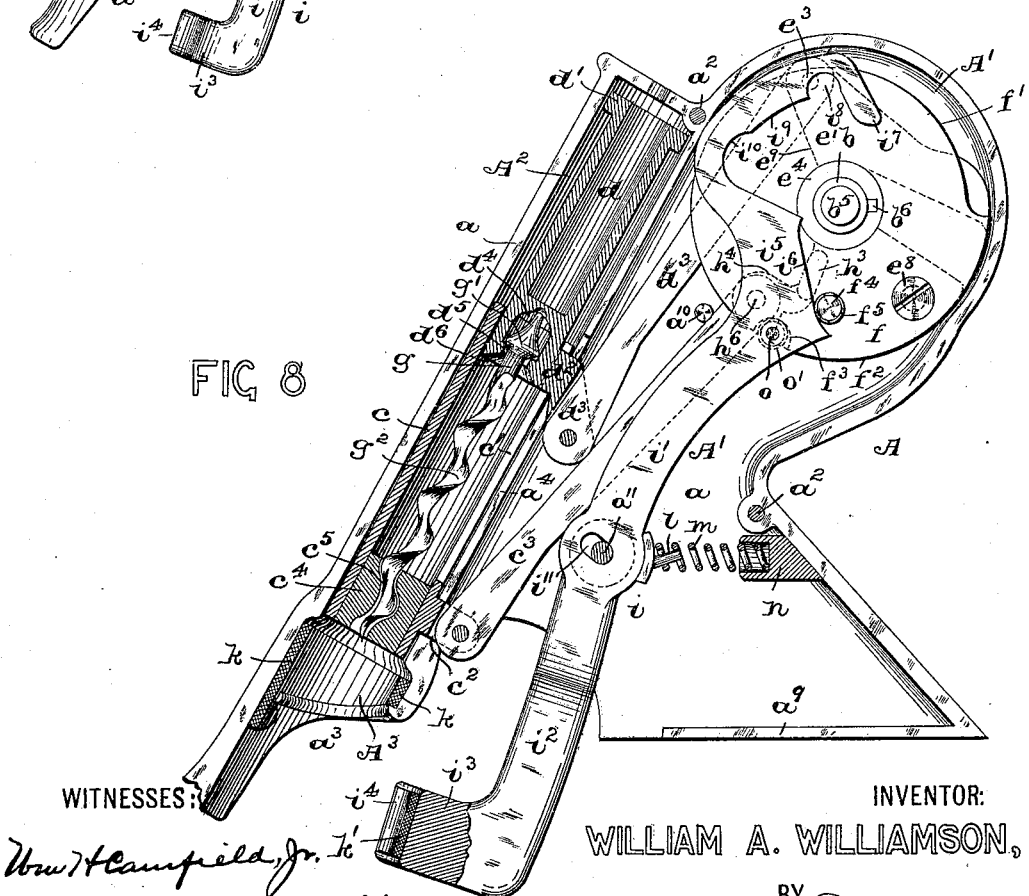
Figure 12:
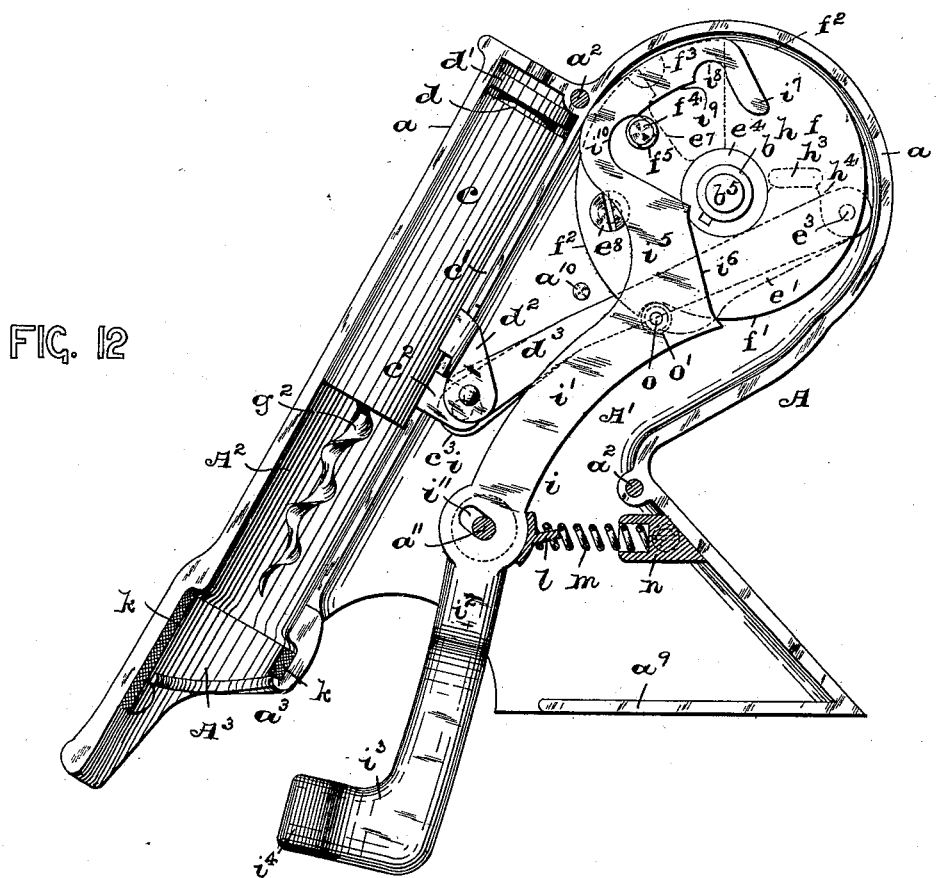
Figure 13:
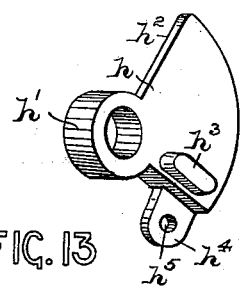
Figure 14:
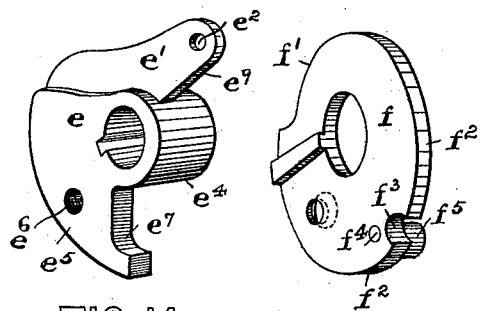
Figure 15:
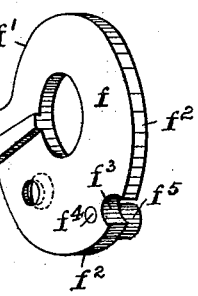

Figure 1 is a side elevation of my novel form of cork-extracting apparatus, and Fig. 2 is a top view of the same. Fig. 3 is a sectional view of the casing of the cork-extractor, illustrating in elevation the arrangement of the corkscrew-operating mechanism, the several parts of this mechanism being represented in their initial or inoperative positions. Fig. 4 represents a longitudinal vertical section of the apparatus, with the corkscrew and operating mechanism in that position after the corkscrew has penetrated the cork and is about to extract it from the neck of the bottle. Fig. 5 is a view of the device similar to that illustrated in Fig. 4, but representing the corkscrew and operating mechanism in that position after the cork has been extracted and the parts about to return to their normal or initial positions to remove the cork from the corkscrew during such return. Fig. 6 is a horizontal cross-section taken on line 6 6 in Fig. 5. Fig. 7 is a side view of a cork-extractor embodying the principles of my present invention and in connection with which I employ a clamp for holding the bottle against the downward pressure while the corkscrew is penetrating the cork; and Fig. 8 is a longitudinal vertical section, with the cork-extracting mechanism and said clamp represented in their initial or inoperative positions. Fig. 9 is a similar view of the apparatus, with the corkscrew and its operating mechanism represented in that position after the corkscrew has penetrated the cork and the clamp has grasped the neck of the bottle. Fig. 10 is a horizontal section taken on line 10 10 in Fig. 9, and Fig. 11 is a perspective view of a plunger for causing the reciprocatory motion of the corkscrew proper. Fig. 12 is a view of the device similar to that illustrated in Fig. 9, representing the corkscrew and its operating mechanism in that position after the cork has been extracted from the neck of the bottle and the clamp has again been disengaged from said neck of the bottle. Figs. 13 and 14 are perspective views of certain lever or arm operating disks or plates, and Fig. 15 is a similar view of a disk or plate for operating the clamping or gripping rod or lever.

Similar letters of reference are employed in all of the above-described views to indicate corresponding parts.

In said drawings, A represents a suitable frame or casing in which the several parts of the operating mechanism of the apparatus are arranged, said frame or casing consisting of a pair of half-shells $a$ and $a'$, which may be secured together by means of suitable screws $a^2$ or in any other well-known manner to form a chamber $A'$ and a cylindrical portion $A^2$ open at the bottom, as at $a^3$, and in communication with said chamber $A'$, as at $a^4$. Rotatively arranged in suitable bearing portions $a^5$ and $a^6$ on the upper parts of the respective shells $a$ and $a'$ is a shaft or spindle $b$, which is securely but operatively retained in said bearings by means of a washer $b'$ and pin $b^2$ at one end and an operating handle or lever $b^3$, secured by means of a pin $b^4$ on the reduced end $b^5$ of said shaft or spindle. Of course it will be evident that said lever or handle $b^3$ may be operatively connected with the shaft or spindle $b$ in any other well-known manner and any other suitable means may be used in connection with the opposite end of said shaft or spindle to retain it in the bearings in said shells $a$ and $a'$.

As will be seen from Fig. 2, the lower portions of the shells $a$ and $a'$ may be provided with flanges $a^7$, having holes $a^8$ for the reception of screws to secure the apparatus upon a bench or bar; but it will also be clearly evident that this means for fastening the apparatus may be dispensed with and an ordinary clamping-screw may be employed, which can be clamped to the edge of the bench or bar and to the inner flanges $a^9$ of the two shells, as will be clearly understood.

Reciprocally arranged in the cylindrical portion $A^2$ of the apparatus is a suitable sleeve or cylinder $c$, which is provided in one side with a longitudinally-arranged slot $c'$, and has directly beneath said slot a pair of perforated ears or lugs $c^2$ or other suitable means for pivotally connecting therewith an arm or lever $c^3$. Suitably secured in the lower open end of said sleeve or cylinder $c$ is a fixed guide $c^4$, having a spiral opening $c^5$, substantially as illustrated in the several figures of the drawings. Slidably arranged in said sleeve or cylinder $c$ is a plunger $d$, the upper end of which extends above the upper and open part of the sleeve or cylinder $c$ and is provided with a guiding-flange $d'$, which fits the inner surface of the cylindrical portion $A^2$ of the casing $A$. Said plunger is also provided with a pair of perforated ears or lugs $d^2$ or other suitable means for pivotally connecting therewith an arm or lever $d^3$. Said ears or lugs $d^2$, as will be seen from the several figures of the drawings, extending into and through the slot $c'$ in the sleeve or cylinder $c$ slide therein, substantially as and for the purposes to be hereinafter more fully set forth. The lower end of said plunger $d$ is provided with a suitable chamber $d^4$ and an annular flange $d^5$, forming an opening $d^6$ in the bottom of the plunger. In one or both sides of said plunger and communicating with the chamber $d^4$ is an opening or openings $d^7$, through which is passed an ordinary corkscrew $g$, provided with an enlargement $g'$, which will fit loosely in the chamber $d^4$ and rests upon said annular flange $d^5$, as clearly illustrated in Figs. 4, 5, and 8.

The spiral or screw portion $g^2$ of the corkscrew fits loosely in the spiral opening $c^5$ in the guide $c^4$, whereby it will be evident that as the plunger $d$ is moved up or down the corkscrew will coöperate with the spiral opening in the guide and will be rotated to the left or to the right and at the same time will move longitudinally.

Secured upon the hereinabove-mentioned shaft or spindle $b$ by means of a suitable key $b^6$ or in any other well-known manner is the disk or plate $e$, (illustrated more especially in Fig. 14,) which is provided with a suitable arm $e'$, extending therefrom, substantially as shown, and has a hole or perforation $e^2$ at or near the free end, in which there is a pin or stud $e^3$ for pivotally securing the opposite end of the lever or arm $d^3$ of the plunger $d$ thereto, as clearly illustrated in Figs. 3, 4, and 8.

As will be more especially seen from an inspection of Fig. 6, the end of the arm $d^3$, which is pivotally secured on said pin or stud $e^3$, is preferably bifurcated, as shown, to embrace the said arm $e'$ on its opposite sides, whereby a stronger and a more perfectly operating connection is the result. On the hub $e^4$, connected with said plate $e$ and extending therefrom on that side practically opposite to that carrying the arm $e'$, is an enlarged portion $e^5$, having a screw-threaded hole $e^6$ and a recessed or other suitable edge $e^7$. Fitted upon said hub $e^4$ and secured against said portion $e^5$ of the disk $e$ by means of a screw $e^8$, screwed into the threaded hole $e^6$, is a supplemental disk or plate $f$, which in the constructions illustrated in Figs. 1 to 6, inclusive, serves as a cover or protector plate to the parts beneath the same. Directly back of the disk or plate $e$ and loosely arranged upon the shaft or spindle $b$ is another disk or plate $h$, having the hub $h'$. Said plate or disk $h$ is preferably of the shape illustrated more particularly in Fig. 13, being provided with a straight edge $h^2$, a protuberance $h^3$, and an ear or lug $h^4$, having a perforation $h^5$. In said perforation $h^5$ I have arranged a pin or stud $h^6$, to which is pivotally secured the opposite end of the arm or lever $c^3$ of the sleeve or cylinder $c$. That portion of said arm or lever $c^3$ which is pivotally attached to said pin or stud $h^6$ is preferably bifurcated, as shown in Fig. 6, to embrace the ears or lug $h^4$ on its opposite sides, whereby a stronger and a more perfectly operating connection is the result. To prevent lateral movement of the several disks $e$ and $h$ on said spindle or shaft $b$, a washer $b^7$ may be used, as clearly illustrated in Fig. 6. As will be noticed from an inspection of the several figures, the lower end of the cylindrical portion $A^2$ of the apparatus is provided with a suitable mouthpiece $A^3$ for the reception of the neck of a bottle and the cork therein, and as an extra precaution to prevent breakage of the neck of the bottle said mouthpiece may be lined in any suitable manner with a soft material, as $k$, made of rubber or any other similar material.

The operations of these several parts hereinabove described for extracting a cork from the neck of a bottle and removing it from the corkscrew as the several parts of the mechanism are returned to their normal or initial positions, ready for a second operation, will be understood and are as follows: The handle or lever $b^3$ is thrown back, as indicated in Fig. 1, whereby the several parts of the mechanism and the corkscrew assume their normally inactive positions, as clearly illustrated in Fig. 3. The neck of the bottle is then inserted into the mouthpiece $A^3$ with the cork in close proximity to the fixed guide $c^4$ in the end of the sleeve or cylinder $c$. While the neck of the bottle is thus held in the said mouthpiece $A^3$, the lever $b^3$ is brought forward so as to cause the shaft or spindle $b$ to make a little more than a quarter-rotation in its bearings, which causes the disk or plate $e$, which is fixed upon the said shaft, as hereinabove stated, to move from the position indicated in Fig. 3 to that indicated in Fig. 4, until the straight edge $e^9$ on the arm $e'$, connected with the plate $e$, comes in contact with the protuberance $h^3$ on the plate or disk $h$, loosely arranged on said shaft or spindle $b$. This movement of the said shaft or spindle $b$ and the disk or plate $e$ has caused the arm or lever $d^3$ to move the plunger $d$ down into the sleeve or cylinder $c$, whereby the loosely-arranged corkscrew is forced through the spiral opening in the fixed guide $c^4$, and while turning is forced directly into the cork in the neck of the bottle. The several parts of the mechanism have now assumed the positions clearly illustrated in Fig. 4, but as the operator still continues to throw the handle or lever $b^3$ forward for a little more than a second quarter-turn the arm $e'$ on the disk or plate $e$ will firmly engage with the protuberance $h^3$ on the disk or plate $h$, and will thus cause the latter to move with the shaft or spindle $b$ until said disks $e$ and $h$ have assumed the positions indicated in dotted outline in Fig. 5. This operation causes the sleeve or cylinder $c$ to move in an upward direction into the upper portion of the cylindrical part $A^2$ of the casing of the apparatus, and with it moves the plunger $d$ and the corkscrew, the latter extracting the cork from the bottle and leaving it impaled upon the corkscrew portion of the same. As soon as the cork has been extracted the handle or lever $b^3$ in being returned to its normal position (indicated in said Fig. 1) will cause the plate or disk $e$ to actuate the lever or arm $d^3$, whereby both the plunger $d$ and the sleeve or cylinder $c$ are forced from their raised positions in Fig. 5 to their lowered positions in Fig. 4 with the cork still impaled upon the corkscrew, and then the plunger $d$ will be caused to move upward again to the position indicated in said Fig. 3, the disk $h$, lever or arm $c^3$, and the sleeve or cylinder $c$ being held in their lowered positions (indicated in said Figs. 3 and 4) by the arm $c^3$ coming in contact with a suitable stop $a^{10}$ in one of the shells forming the chamber $A'$ of the apparatus. The receding corkscrew is now again caused to coöperate with the spiral opening in the fixed guide $c^4$, which causes the withdrawal of the cork from the screw portion of the corkscrew and its ejection from the mouthpiece $A^3$ of the cork-extracting apparatus.

From the above description it will be seen that the constructions and operations of the several parts of mechanism are very simple and can be readily replaced in case of the breakage or inoperativeness of any one part, and the withdrawal of the cork from the neck of the bottle, as well as its removal from the corkscrew, is quickly and automatically accomplished by the simple forward and backward or oscillatory movements of the lever or handle $b^3$ and the mechanism connected therewith.

In Figs. 7, 8, 9, and 12 I have illustrated in connection with my novel form of cork-extractor a gripping or clamping lever for gripping the neck of the bottle and holding it against the downward pressure while the corkscrew is penetrating the cork. The construction and operation of this lever are such that the bottle is brought into the proper position beneath the descending corkscrew to prevent the breaking of the bottle at the neck, as is so often the case with cork-extracting devices as generally made. To operate and actuate said gripping or clamping lever, (indicated by the reference-letter $i$ and pivotally arranged upon a pin or stud $a^{11}$ in the chamber $A'$ of the apparatus,) I employ the plate or disk $f$, which is connected with the disk or plate $e$ in the manner hereinabove described. Said plate or disk $f$ is preferably cam-shaped, as at $f'$, and at a certain portion in its circumferential edge $f^2$ there is a semicircular recess $f^3$. Said disk or plate $f$ is also provided with a pin or stud $f^4$, on which is rotatively arranged a suitable roller or wheel $f^5$. The lever $i$ comprises an upper arm $i'$ and a lower arm $i^2$, the latter being formed at the bottom with a portion $i^3$ at a right angle thereto, or approximately so, which terminates in a holding or gripping portion $i^4$, lined with a soft material $k'$, of rubber or the like. The upper arm $i'$ of the lever $i$ has a peculiarly-bent part $i^5$, having the slightly-curved edge $i^6$, a finger or extension $i^7$, a circular recess $i^8$, a curved edge $i^9$, and a second curved recess $i^{10}$, all of which during some time of operating the parts of the apparatus are brought into operative contact with the roller or wheel $f^5$ on said pin or stud $f^4$ on the plate $f$, as will be hereinafter set forth. Said lever $i$ has a suitable post $l$ directly opposite its fulcrum or pivotal support, on which there is a spring $m$, the opposite end of which is suitably secured to one of the shells forming the chamber $A'$ of the apparatus and preferably in a socketed device $n$, formed integral with one of said shells or is secured thereto in any well-known manner. On the under side of the arm $i'$ of said lever $i$ is a pin or stud $o$, having a roller or wheel $o'$ rotatively arranged thereon, which when the several parts of the apparatus are in their initial or inoperative positions fits directly into the said semicircular recess $f^3$ of the disk or plate $f$, as clearly illustrated in Fig. 8. The roller or wheel $f^5$ when the parts are in this position is also in operative contact with the curved edge $i^6$ of the part $i^5$ of said arm $i'$. As soon as the lever or arm $b^3$ is pulled forward in the manner previously described to bring the disks or plates $e$ and $h$ and their connecting mechanism from the positions in Fig. 8 to the positions in Fig. 9, which correspond to the positions in Figs. 3 and 4, respectively, the roller or wheel $o'$ will be forced from the recess $f^3$ in the plate $f$ and against a portion of the circular edge $f^2$ of said disk. The compressed spring $l$ will force the lower arm $i^2$ of the lever $i$ forward, and its holding or gripping portion $i^4$ will tightly grip the neck of the bottle, which has been inserted in the mouthpiece $A^3$, and hold it there while the wheel or roller $f^5$ moves along the curve $i^6$ and finally lands in the circular recess $i^8$, as indicated in Fig. 9. During this operation the corkscrew has entered and pierced the cork in the manner previously described; but during the step of extracting the cork from the neck of the bottle said wheel or roller $f^5$ will move along the curved edge $i^9$ until it comes nearly opposite the recess $i^{10}$, while the wheel or roller $o'$ has passed along the cam-shaped edge $f'$ of the disk or plate $f$, which causes the gripper portion $i^4$ of the arm $i^2$ to move away from its holding engagement with the neck of the bottle, whereby the latter, with its cork extracted, can then be removed from the mouthpiece $A^3$ of the apparatus, as will be clearly understood from an inspection of said Fig. 12. When the lever or arm $b^3$ is returned to its normal position, (indicated in Fig. 7,) the said spring $l$ and the wheels or rollers $f^5$ and $o'$, in operative engagement with the respective edges $i^9$ and $i^6$ on the arm $i'$ and the cam-shaped surface or edge $f'$ on the disk or plate $f$, will cause said lever $i$ to assume its normal position, (indicated in Figs. 7 and 8,) and the several parts of the apparatus are returned to their initial positions for the insertion of the neck of a second bottle into the mouthpiece $A^3$ for the extraction of the cork therefrom in the manner hereinabove described.

As will be seen from Fig. 12, the lever $i$ may have the hole or opening $i^{11}$ made elongated, whereby the said arm or lever is capable of a lateral movement on said pin or stud $a^{11}$ to permit the lower gripper portion on the arm $i'$ of said lever to readily accommodate itself to the various sizes of the necks of bottles without any danger of breaking the same by too great pressure thereon, as might be the case when the lever $i$ is not capable of such a lateral movement on its fulcrumal pin or support.

From the above description it will be fully evident that the apparatus is perfectly operative for extracting corks from the necks of bottles either with or without a clamping or gripping device, such as a lever $i$.

I am fully aware that many changes may be made in the several arrangements and combinations of parts, as well as in the details of construction thereof, without departing from the scope of my invention. Hence I do not limit myself to the exact arrangements and combinations of the parts herein shown and described nor to the details of construction thereof.

Having thus described my invention, what I claim is—

1. In a cork-extractor, the combination, with a suitable casing, formed with a cylindrical portion, of a sleeve or cylinder adapted to slide therein, having a longitudinally-arranged slot in its side, a shaft or spindle in said casing, an oscillating lever or arm connected with said spindle or shaft, a disk or plate fixed on said shaft, and an arm pivotally and operatively connected at its opposite ends to said disk or plate and said sleeve or cylinder, respectively, a plunger and guide in said sleeve or cylinder, and a corkscrew connected with said plunger and movably arranged in said guide, and ears or lugs on said plunger extending through said slot in said sleeve or cylinder, substantially as and for the purposes set forth.

2. In a cork-extractor, the combination, with a suitable casing, formed with a cylindrical portion, of a sleeve or cylinder adapted to slide therein, a shaft or spindle in said casing, and an oscillating lever or arm connected with said spindle or shaft, a disk or plate fixed on said shaft and an arm pivotally and operatively connected at its opposite ends to said disk or plate and said sleeve or cylinder respectively, a guide in said sleeve or cylinder, a reciprocatory-moving plunger in said sleeve or cylinder, a corkscrew rotatively connected with said plunger and extending into and through said guide, and mechanism connected with said plunger and said oscillating lever or arm for actuating said plunger, substantially as and for the purposes set forth.

3. In a cork-extractor, the combination, with a suitable casing, formed with a cylindrical portion, of a sleeve or cylinder adapted to slide therein, a shaft or spindle in said casing, and an oscillating lever or arm connected with said spindle or shaft, a disk or plate fixed on said shaft and an arm pivotally and operatively connected to said disk or plate and said sleeve or cylinder having in its lower end a suitable chamber and an annular flange respectively, a guide in said sleeve or cylinder, a reciprocatory-moving plunger by having an enlargement arranged in said chamber in said sleeve or cylinder, a corkscrew rotatively connected with said plunger and extending into and through said guide, and mechanism connected with said plunger and said oscillating lever or arm for actuating said plunger, consisting, essentially, of a second disk or plate loosely arranged on said shaft or spindle, adapted to be operatively engaged by said fixed disk or plate, and an arm pivotally and operatively connected at its opposite ends to said loose disk or plate and said plunger respectively, substantially as and for the purposes set forth.

4. In a cork-extractor, the combination, with a suitable casing, formed with a cylindrical portion, of a sleeve or cylinder adapted to slide therein, a shaft or spindle in said casing, and an oscillating lever or arm connected with said shaft or spindle, mechanism connected with said sleeve or cylinder for causing the reciprocatory-sliding motion of the same, a reciprocatory-moving plunger in said sleeve or cylinder, a corkscrew rotatively connected with said plunger, and mechanism connected with said plunger and said oscillating lever or arm for actuating said plunger, consisting, essentially, of a disk or plate operatively arranged on said shaft or spindle, and an arm pivotally and operatively connected at its opposite ends with said disk or plate and said plunger respectively, substantially as and for the purposes set forth.

5. In a cork-extractor, the combination, with a suitable casing, formed with a cylindrical portion, of a sleeve or cylinder $c$ therein, having a perforated lug or ear $c^2$, a fixed guide $c^4$ in said sleeve or cylinder, having a spiral opening, a plunger in said sleeve or cylinder, a corkscrew connected with said plunger and loosely but operatively arranged in said guide, a shaft or spindle in said casing, and an oscillating arm or lever connected with said shaft or spindle, a disk or plate $e$ fixed on said shaft or spindle having an arm $e'$, and an arm $c^3$ pivotally connected with said arm $e'$ and said lug or ear $c^2$, substantially as and for the purposes set forth.

6. In a cork-extractor, the combination, with a suitable casing, formed with a cylindrical portion, of a sleeve or cylinder $c$ therein, having a perforated lug or ear $c^2$, a fixed guide $c^4$ in said sleeve or cylinder, having a spiral opening, and a slot $c'$ in one side of said sleeve or cylinder $c$, a plunger $d$ in said sleeve or cylinder, a lug or ear $d^2$ on said plunger arranged to project through said slot $c'$, a chambered portion $d^4$ in said plunger and a corkscrew operatively held in said chambered portion, having its screw portion rotatively arranged in the spiral opening of said guide, a shaft or spindle in said casing, and an oscillating arm or lever connected with said shaft or spindle, a disk or plate $e$ fixed on said shaft or spindle, having an arm $e'$, an arm $c^3$ pivotally connected with said arm $e'$ and said lug or ears $c^2$ on said sleeve or cylinder $c$, a disk or plate $h$ loosely arranged on said shaft or spindle, but adapted to be operatively engaged by said disk or plate $e$, and an arm $d^3$ pivotally and operatively connected with said disk or plate $h$ and said lug or ear $d^2$, on said plunger $d$, substantially as and for the purposes set forth.

7. In a cork-extractor, the combination, with a suitable casing, a corkscrew reciprocating therein, and a reciprocable but non-rotating guide having a spiral opening through which said corkscrew extends, of an oscillating arm or lever and connecting mechanism for operating said corkscrew and said guide, a disk or plate on the shaft of said arm or lever and a gripping or clamping arm adapted to be simultaneously actuated by the action of the said disk or plate connected with said oscillating arm or lever, substantially as and for the purposes set forth.

8. In a cork-extractor, the combination, with a suitable casing, a corkscrew reciprocating therein, and a reciprocable but non-rotating guide having a spiral opening through which said corkscrew extends, of an oscillating arm or lever and connecting mechanism for operating said corkscrew and said guide, and a gripping or clamping arm adapted to be simultaneously actuated by the action of said oscillating arm or lever, said gripping or clamping lever having a slotted opening $i^{11}$, and a pin in said casing extending into said opening, substantially as and for the purposes set forth.

9. In a cork-extractor, the combination, with a suitable casing, a corkscrew reciprocating therein, and a reciprocable but non-rotating guide having a spiral opening through which said corkscrew extends, of a shaft or spindle in said casing, a disk or plate $f$ on said shaft or spindle, an oscillating arm or lever on said shaft or spindle, and connecting mechanism for operating said corkscrew and guide, a gripping or clamping lever pivotally arranged in said casing, having its one end in operative engagement with said disk or plate $f$, and being adapted to be simultaneously actuated with the screw and guide operating mechanism by the action of said oscillating arm or lever and the disk or plate $f$, and a spring in engagement with said gripping or clamping lever, substantially as and for the purposes set forth.

10. In a cork-extractor, the combination, with a suitable casing, a corkscrew reciprocating therein, and a reciprocable but non-rotating guide having a spiral opening through which said corkscrew extends, of a shaft or spindle in said casing, a disk or plate $f$ on said shaft or spindle, an oscillating arm or lever on said shaft or spindle, and connecting mechanism for operating said corkscrew and guide, a gripping or clamping lever pivotally arranged in said casing, having its one end in operative engagement with said disk or plate $f$, and being adapted to be simultaneously actuated with the screw and guide operating mechanism by the action of said oscillating arm or lever and the disk or plate $f$, substantially as and for the purposes set forth.

11. In a cork-extractor, the combination, with a suitable casing, formed with a cylindrical portion, of a sleeve or cylinder adapted to slide therein, a shaft or spindle in said casing, an oscillating lever or arm connected with said spindle or shaft, a disk or plate fixed on said shaft and an arm pivotally and operatively connected at its opposite ends to said disk or plate and said sleeve or cylinder respectively, a guide in said sleeve or cylinder, and a corkscrew movably arranged in said guide, and a gripping or clamping lever pivotally arranged in said casing adapted to be simultaneously actuated by the action of the oscillating lever or arm connected with said spindle or shaft, substantially as and for the purposes set forth.

12. In a cork-extractor, the combination, with a suitable casing, formed with a cylindrical portion, of a sleeve or cylinder adapted to slide therein, a shaft or spindle in said casing, and an oscillating lever or arm connected with said spindle or shaft, a disk or plate fixed on said shaft and an arm pivotally and operatively connected at its opposite ends to said disk or plate and said sleeve or cylinder respectively, a guide in said sleeve or cylinder, a reciprocatory-moving plunger in said sleeve or cylinder, a corkscrew rotatively connected with said plunger and extending into and through said guide, and mechanism connected with said plunger and said oscillating lever or arm for actuating said plunger, and a gripping or clamping lever pivotally arranged in said casing adapted to be simultaneously actuated by the action of the oscillating lever or arm connected with said spindle or shaft, substantially as and for the purposes set forth.

13. In a cork-extractor, the combination, with a suitable casing, formed with a cylindrical portion, of a sleeve or cylinder adapted to slide therein, a shaft or spindle in said casing, and an oscillating lever or arm connected with said shaft or spindle, mechanism connected with said sleeve or cylinder for causing the reciprocatory-sliding motion of the same, a reciprocatory-moving plunger in said sleeve or cylinder, a corkscrew rotatively connected with said plunger, and mechanism connected with said plunger and said oscillating lever or arm for actuating said plunger, a disk or plate $f$ on said shaft or spindle, a gripping or clamping lever pivotally arranged in said casing having its one end in operative engagement with said disk or plate $f$ and being adapted to be simultaneously actuated with the sleeve or cylinder operating and the plunger-operating mechanisms, by the action of said oscillating lever, substantially as and for the purposes set forth.

14. In a cork-extractor, the combination, with a suitable casing, formed with a cylindrical portion, of a sleeve or cylinder adapted to slide therein, a shaft or spindle in said casing, and an oscillating arm or lever connected with said shaft or spindle, mechanism connected with said sleeve or cylinder for causing the reciprocatory-sliding motion of the same, a reciprocatory-moving plunger in said sleeve or cylinder, a corkscrew rotatively connected with said plunger, and mechanism connected with said plunger and said oscillating lever or arm for actuating said plunger, consisting, essentially, of a disk or plate operatively arranged on said shaft or spindle, and an arm pivotally and operatively connected at its opposite ends with said disk or plate and said plunger respectively, a disk or plate $f$ on said shaft or spindle, a gripping or clamping lever pivotally arranged in said casing, having its one end in operative engagement with said disk or plate $f$ and being adapted to be simultaneously actuated with the sleeve or cylinder operating and the plunger-operating mechanisms, by the action of the oscillating arm or lever, substantially as and for the purposes set forth.

15. In a cork-extractor, the combination, with the corkscrew-operating mechanism thereof, arranged in a suitable casing, of a shaft or spindle in said casing, an oscillating arm or lever thereon, a disk or plate $f$ on said shaft or spindle, a gripping or clamping lever pivotally arranged in said casing, a roller $f^5$ on said plate $f$, a bent portion $i^5$ on said gripping or clamping arm, having curved surfaces or edges $i^6$ and $i^9$ and recesses $i^8$ and $i^{10}$ adapted to come in operative contact with said roller $f^5$, a roller $o'$ on said gripping-arm, and a recessed portion $f^3$ and curved edges $f^2$ and $f'$ on said plate $f$, adapted to come in operative contact with said roller $o'$, all arranged to cause said gripping or clamping lever to be actuated simultaneously with the corkscrew-operating mechanism, during the movements of the oscillating arm or lever, substantially as and for the purposes set forth.

In testimony that I claim the invention set forth above I have hereunto set my hand this 29th day of September, 1897.

WILLIAM A. WILLIAMSON.

Witnesses:
 FREDK. C. FRAENTZEL,
 WM. H. CAMFIELD, Jr.